United States Patent [19]

Dravnieks

[11] 3,815,405

[45] June 11, 1974

[54] METHOD OF ANALYZING ODORS
[75] Inventor: Andrew Dravnieks, Chicago, Ill.
[73] Assignee: IIT Research Institute, Chicago, Ill.
[22] Filed: Nov. 30, 1972
[21] Appl. No.: 310,773

[52] U.S. Cl................ 73/23, 23/232 R, 23/232 C, 73/23.1
[51] Int. Cl. ........................................... G01n 31/08
[58] Field of Search.............. 73/23, 23.1; 23/232 R, 23/232 C

[56] References Cited
UNITED STATES PATENTS

| | | | |
|---|---|---|---|
| 2,837,912 | 6/1958 | Moncrieff | 73/23 |
| 3,545,949 | 12/1970 | Oister | 73/23 X |
| 3,618,359 | 11/1971 | Randebrock et al. | 73/23 |
| 3,686,930 | 8/1972 | Kniebes et al. | 73/23 X |

OTHER PUBLICATIONS

"Determination of Petroleum Wax Odor by Chromatography," L. R. Durrent, Analytical Chemistry, Vol. 38, No. 6, May 1966, pp. 745–748.

"Structural Invest. with Aid of Kovats Retent. System," J. Jonas et al., Journal of Gas Chromatography, 4(9) 332–335 (1966).

*Primary Examiner*—Richard C. Queisser
*Assistant Examiner*—Stephen A. Kreitman
*Attorney, Agent, or Firm*—Fitch, Even, Tabin & Luedeka

[57] ABSTRACT

A method of analyzing odors is provided in which an odorant sample is passed through a plurality of gas chromatographic columns having stationary phases of differing chemical polarity. The numerical value of various subjective odor dimensions of the odorant sample which otherwise would involve subjective test panel analysis, may be determined from the retention times of the odorant sample with respect to the various stationary phase materials.

7 Claims, No Drawings

METHOD OF ANALYZING ODORS

This invention relates generally to the characterization and measurement of odors and more particularly to a method for objectively and quantitatively determining the subjective or sensory properties or dimensions of odorants which will correspond to judgments made by human test panels.

Odors of chemical substances play important roles in government and industry in determining the usefulness and acceptability to the consumer of foods, beverages, paints, fabrics, plastics, cosmetics, and horticultural products, in health care, and in air and water pollution by industrial, agricultural, and human waste, as well as myriad other areas of life. Odors are sensations caused by many substances called odorants when the vapors of such substances reach the chemical sensing olfactory and trigeminal organs of humans. These sensations depend on the concentration of odorant in the air and on the nature of the odorant. The senations can differ and exhibit several sensory attributes or dimensions, as outlined in the 1972 ASHRAE Handbook of Fundamentals, p. 188, published by the American Society of Heating Refrigeration, and Air Conditioning Engineers.

The principal quantitative subjective dimension of odor is odor intensity. At low enough intensities, the sensation becomes so weak that it cannot be experienced. The boundary between the reliably detectable intensity and the intensity not reliably detectable is the threshold intensity, and the corresponding concentration of the odorant in the air is the threshold concentration. A further important psychophysical (sensory) function is the change of subjective intensity as a function of changes in odorant concentration.

The principal qualitative subjective dimensions of an odor are its hedonic value (pleasantness-unpleasantness) and the odor character or quality. The latter is the property which makes two odors distinguishably different although they may be equally intense and smell equally pleasant or unpleasant.

Sensory stimuli such as light and sound can be measured by instruments since it has been established that wavelengths and energy of the respective radiations reaching human sense organs are the principal factors determining the light and sound quality and intensity experienced by humans. Thus, there are many instruments available for objectively predicting the effects of these stimuli on humans.

Such is not the case with odors. Many theories have been proposed for several decades, and it has been proposed that models of olfaction might to some degree be based on principal molecular properties of odorants (see, for example, Dravnieks, In Olfaction and Taste II, Hayashi, ed., p. 89, Pergamon Press, Oxford, 1967; Laffort, In Olfaction and Taste III, Pfaffman, ed., p. 150, The Rockefeller University Press, New York, 1969). However, instrumental methods for measuring selected parameters in an appropriate relationship to predict and compare odor properties with substantial accuracy have yet to be elucidated. Until now, government and industry have been left the vagaries and expense of human judgment in the evaluation of odors.

The method commonly used to predict and compare odor properties is the sensory panel. Briefly, this involves exposing a group of human test subjects to an odorant and statistically comparing their judgments as to the particular odor property under study. A horough description of the makeup and operation of sensory test panels appears in the "Manual on Sensory Testing Methods" published by the American Society for Testing and Materials (ASTM No. STP-434, 1968). As will be appreciated, the use of sensory test panels to measure and compare odors requires great care and expense to insure the validity of the test results. For example, discrimination testing requires specially trained panels and special facilities. Preference testing, on the other hand, requires selection of a untrained panel representative of the general public (or a particular segment thereof) as well as special facilities. Thus, a considerable need exists for devising a method for measuring odor properties without the aid of human judgment.

In accordance with the invention described herein, human judgment can be substituted for by a method utilizing parameters which can be calculated from certain instrumentally measurable properties of odorants to determine one or more subjective dimensions thereof, more specifically those properties which can be derived from the solubilities of odorants in appropriately selected, stationary solvent phase materials.

Accordingly, it is an object of this invention to provide a method for objectively analyzing an odorant to determine one or more subjective dimensions thereof.

This and other objects will become apparent upon consideration of the following description of the invention.

Briefly the invention consists of a method for the determination of quantitative numerical values of one or more of the subjective dimensions of an atmosphere odorant, such as odor intensity, threshold concentration, change of intensity with concentration or slope factor, hedonic value, and quality.

In accordance with this method, an atmospheric sample of an odorant is provided for analysis. The sampled material is passed through a plurality of gas-chromatographic columns, which are devices for measuring the delay experienced by a gaseous sample flowing through a column or tube containing another material known as the stationary phase, which, for example, might be arranged as a matrix through which the gaseous sample flows within the column. Each gas-chromatographic column contains a different stationary phase material, these materials being preselected such that one is a chemically non-polar material, and such that the other stationary phase materials are chemically polar. The relative solubilities of the odorant sample with respect to each of the stationary phase materials may then be determined by measuring the amount of time required for the sample to pass through each of the columns.

The quantitative numerical value of the subjective dimensions of a the odorant sample may be derived, using the relative solubilities obtained, by use of predetermined mathematical function which has been provided by correlating the relative solubilities of a plurality of known odorant materials in the same stationary phase materials as the sample odorant with subjectively determined quantitative numerical values for those odorant materials.

Examining the method in greater detail, the odorant sample is generally obtained in a gaseous state in the atmosphere. For example, for pollution control measurements, on site atmosphere samples or stack or other effluent samples may be taken in sealed containers for subsequent analysis at the instrument location. Liquid samples may be obtained but must be converted to the gaseous state for use in the gas-chromatographic column. The chemical analysis of the sample odorant may be known but this is not necessary to the performance of the method described herein. With an unknown odorant, its concentration may be determined using one of the gas chromatographic columns and a detector as is customarily done in the gas chromatographic art.

The conventional gas-chromatographic process consists in determining the delay which a substance experiences in passage through a gas-chromatographic partition column when the vapor of such substance is flushed through the column by means of a constant flow of an inert carrier gas. The gas chromatographic column is a tube which contains a stationary phase such as a liquid or a grease film, or an adsorbative surface distributed on the inner walls of a tube or on the surface of particles, called a support phase used as a packing in the tube. The carrier gas is generally non-reactive with the substance to be analyzed, the stationary phase, and the column walls. Typically, helium, nitrogen, or argon are used.

The duration of the delay is measured by ascertaining the time which elapses from the moment when the substance is injected into the carrier gas just before it enters the column until a detector device at the other end of the column detects the arrival of the substance there. A typical detector is a hydrogen flame ionization detector, but other detectors can also be used.

The rate of passage of various substances through a gas-chromatographic column depends on the rate of the carrier gas flow, amount of the stationary phase in the column, the vapor pressure of the substance, the substance itself and its solubility in the stationary phase, and the adsorbtivity of the substance at the support surface at the temperature maintained in the gas-chromatographic partition column. If the flow rate and the temperature are maintained constant, the same substance experiences different durations of delay in the presence of different stationary phases if the solubility of this substance in different stationary phases is not equal; that is, the delay is longer if the solubility of the substance in the stationary phase is larger. When the rate of carrier gas flow is within reasonable limits, changed without changing the temperature, the delay or the retention time of a substance in a column changes in inverse proportion thereto, so that the volume of the carrier gas needed to effect the substance's passage (i.e., the retention volume) generally remains the same.

Thus, other conditions being held constant, the gas chromatographic retention times indirectly measure the solubility of the substances in the stationary phases. This solubility depends on the properties of both the stationary phases and the substances, and their interactions under the conditions in the gas-chromatographic column.

When the retention times or volumes are referred to the scale of retention times of some selected compounds, a notation results which is relatively independent of the actual flow rates, the amount of the same stationary phase in the column, and, to a lesser but useful extent, also of temperature. One of convenient systems is Kovats retention index system, described by E. sz Kovats in Advances in Chromatography, Vol. I, Chapter 7, p. 229, Marcel Dekker, New York, 1965. It uses the n-alkane series as the reference scale and the following formula:

$$I_x = 100m + 100\ [\log(V_x/V_m)/\log(V_{m+1}/V_m)]$$

Here $I_x$ is the retention index, or Kovats Index, abbreviated KI in the following discussion; $V_x$ is the net retention volume of the substance whose KI is to be determined, and is calculated from the actual retention time after conventional corrections for retention time of an unadsorbable gas and for the carrier gas pressure drop in the column; $V_m$ is the net retention time of that of n-alkanes which elutes from the same column as the last one before the substance; $m$ is the number of the carbon atoms in this n-alkane; and $V_{m+1}$ is the net retention time of that n-alkane whice elutes first after the elution of the substance. In this system, the n-alkanes elute, by definition, at KI corresponding to equal 100 units.

If a substance, for example, 1-butanol, elutes in a certain gas-chromatographic column, for example, a silicone oil with the trade designation OV1, at a KI value of 644, and in another column, such as dinonylphthalate, at KI = 733, the difference 733 − 644 = 89 KI units is an indication and an indirect measure of the additional intermolecular interactions which 1-butanol molecule experiences with the dinonylphthalate stationary phase as compared with the silicone oil stationary phase. Such increments are useful relative measures of the differences in the intermolecular interactions between a substance and the various gas-chromatographic stationary phases. Although other measures of intermolecular interactions can be derived from the gas-chromatographic data, they will simply differ in the convenience of obtaining and usage, but not in the principle of relating to the relative solubilities of the substances in different solvents.

As will be readily appreciated by one skilled in the art, standard gas-chromatographs may be used in the practice of the method herein described. For example, one may use a 15 foot long, ⅛ inch O.D. gas-chromatographic column at a temperature of 120°C with helium as a carrier gas flowing at a rate of 60 ml/min. The stationary phase may constitute 20 percent, by weight of a stationary phase material of choice on a 60 to 80 mesh Chromosorb G support phase.

A hydrogen flame ionization detector may be used as the column effluent monitor.

However, in view of the multiple determinations with respect to a plurality of different stationary phase materials which are to be made in accordance with various features of the present invention, it may be desirable to employ a gas-chromatographic device which is particularly adapted in respect of the present invention. In this connection, it may be desirable to employ a gas-chromatographic device having a single sample injection port means and a single inert gas supply means to the injection port.

A suitable manifold means following the injection port divides the inert gas flow (and sample) into a plurality of separate streams which are each conducted respectively to a corresponding, separate gas chromatographic column. Each of the separate columns has a different stationary phase material, and is provided with a separate detection means. Through the use of such a gas-chromatographic device, simultaneous measurement of the relative retention times for the different stationary phase materials may be carried out with a single sample. If a gas chromatograph with a single column is used, multiple instrument runs are required to obtain the same data.

In accordance with the present invention, the selection of the different stationary phase materials to be used must be made in accordance with the following criteria. One of the stationary phase materials must be essentially non-polar in the gas-chromatographic sense, that is, substantially devoid of polar functional groups. The other stationary phase materials must be polar but of differing polarity in the gas-chromatographic sense, that is, containing different polar functional groups. It is believed that odor stimuli are the result of intermolecular interaction forces between the odorant and the olfactory and trigeminal organs of the body, and which may be related to a limited number of types of interactions or forces, such as van der Waals forces, hydrogen bonding forces, electron donor or acceptor effects and dipole interactions. In accordance with the present invention, the odorant is characterized quantitatively with respect to the degree of its interaction with a plurality of different stationary phase materials. In order to provide different points of reference for this measurement, the stationary phase materials should vary in polarity including their relative properties with respect to these various types of interactions and forces. Thus, a group of these materials might include a non-polar material, such as squalane; a hydrogen bonding material, such as a polyether; a material containing conjugated double bonds, such as polyphenylether; and a strong election acceptor, such as trifluropropylsilicone.

Although hundreds of stationary phase materials are known and used commercially, from one to five, and usually four, are sufficient to practice the method taught herein. It will be appreciated, however, that the stationary phase materials should correspond to those stationary phase materials used in establishing the particular mathematical function employed to determine the quantitative numerical values of the various odor dimensions which will be explained below.

The predetermined mathematical function is determined generally by obtaining the relative solubilities of several known odorants with respect to various stationary phase materials, in the same manner as that described above for determining the relative solubilities of the odorant sample, obtaining the subjective odorant dimensions from a human sensory test panel, and correlating the relative solubility data with the sensory test panel data in a suitable manner such as by means of statistical stepwise regression analysis.

In determining the mathematical correlation function, a more accurate correlation can be insured if a broad range of odorants is used. Even further accuracy can be obtained if some odorants which are similar in nature to the types of sample odorants expected to be analyzed are included in determining the correlation function. For example, if it were anticipated that the odorants samples were noxious air pollutants of a particular type or chemical nature, several similar odorants would be included in the correlation group.

The determination of the relative solubites of the correlation odorants is determined in the same manner as for the sample odorant. It is contemplated that in the practical application of this invention, once the mathematical correlation function for subjective odorant dimension has been obtained with a given set of stationary phase materials, all odorant samples will be analyzed using these same stationary phase materials. Thus, the mathematical correlation functions for each odorant dimension need be determined but once, in order to provide the predetermined correlation functions for an indefinitely large number of subsequent, standardized quantitative analyses of different odorant samples. It is recognized however, that the gas-chromatographic data could be first obtained for the odorant sample and the correlation function then determined using the same stationary phase materials.

The human sensory test panel data is obtained by diluting odorant vapors with room air to various constant dilution levels and exposing them to a panel of eight or nine test subjects. The panelists are asked to make various odor judgments as needed for each subjective odor dimension and their judgments are then averaged using either logarithmic or arithmetical averages depending on the particular scales used. A detailed description of the make up and operation of human sensory test panels can be found in the previously mentioned "Manual on Sensory Testing Methods" published by ASTM.

The mathematical correlating function may then be determined by statistically correlating the gas-chromatographic data with the data determined from the sensory test panel. This function may take the form: Subjective Odor Dimension = $C_0 + C_1$ (GC property No. 1) + $C_2$ (GC property No. 2) + $C_3$ (GC property No. 3 + . . . where $C_0$, $C_1$, $C_2$, $C_3$, etc., are constants; and the specific GC property function is a gas-chromatographic parameter based on the relative solubility of the odorant sample in the particular stationary phase material.

The specific GC properties used are desirably based on a function such as the previously described Kovats Index of the odorant in a particular stationary phase material. The GC property function may be the respective numerical Kovats Index quantity for the particular stationary phase material, as well as the sum or difference in the Kovats Indices in different phases, multiplicative products of the Kovats Indices in different stationary phases, and squares, higher order terms, and transformations of these. It will be seen that the subjective odor dimension function is single-valued with respect to the subjective odorant dimension, and multi-valued with respect to the GC properties.

For a given group of stationary phase materials, the particular GC properties and respective constants for the function equation can be determined for each separate subjective odorant dimension previously described, by statistically correlating the gas-chromatographic data for several odorants with sensory panel data collected for the same odorants using statistical stepwise regression anaylsis procedure, which is available as standard software on many contemporary computers. For example, the functions derived hereinafter were developed with a UCC 1108 computer using University of California Health Computer Facility Biomedical Program BMD02R, Version 2.3. The computation results in selecting those GC properties and constants which jointly produce the best correlation function, the latter being the equation yielding the odor dimension values closest, in average over the odorants used, to the values measured by the human test panels.

It will be appreciated that the correlation function established for an odorant dimension will vary somewhat depending on the stationary phase materials used. However, if the same stationary phase materials are used for the sample odorant, the odor dimensions determined should be accurate if the original sensory panel data was statistically valid.

As in most life science disciplines, the experimental values are subject to errors and the correlation functions can represent the data only to a certain degree of precision. In stepwise regression analysis procedure based on several variables, the quality of the correlation is characterized in F-ratio values, a statistical term explained and tabulated in statistics texts and handbooks. These books list F values which must be exceeded if the correlation is to be considered valid at a certain probability-of-error for the respective number of cases used to establish the correlation and the respective number of terms used in the correlation function. For the purpose of this invention a correlation is statistically valid if the probability of error is less than 0.05, a level conventionally used in life science disciplines.

Turning now to specific examples of calculations for subjective odorant dimensions and specific stationary phase materials, the odor intensity of 250 parts per million (ppm) by volume of 1-butanol in air has been judged by many sensory panels to best correspond to average odor intensity, one which is neither too weak nor too strong. Thus, this concentration of 1-butanol may be used by the sensory panel as a reference. Odor intensity is then described by the concentration at which an odorant exhibits an odor intensity equivalent to a reference material such as 1-butanol at 250 ppm by volume in air. The following correlation function may be used to determine this concentration of a sample odorant in accordance with the invention:

$$\text{Log}_{10} Z = 18.9 - 2.33 \times 10^{-2} K_1 + 8.9 \times 10^{-6} K_1^2 + 3.8 \times 10^{-9} K_1^2 (K_2 - K_3) + 2.4 \times 10^{-8} K_3^2 (K_4 - K_3)$$

where $Z$ is the concentration of the odorant in air in nanograms per liter (1 nanogram = $10^{-9}$ grams);

$K_1$ is the Kovats Index of the odorant in one particular stationary phase material, sucrose acetate isobutyrate;

$K_2$ is the Kovats Index of the odorant in another stationary phase material, QF1, a silicone oil;

$K_3$ is the Kovats Index of the odorant in another stationary phase material, OV1, a methylsilicone oil; and $K_4$ is the Kovats Index of the odorant in the stationary phase material, Apiezon M, a hydrocarbon.

This equation was derived by regression analysis, as described above, for test panel data and corresponding gas-chromatographic data, for a number of odorant materials and the indicated stationary phase materials.

The test panel data and Kovats Indices for the odorant materials used in the determination of this equation for these stationary phase materials are set forth in Table I. The calculated value for each of the odorants, based on the equation, are also set forth in the table. The F-ratio statistical index for the correlation of the calculated data to the sensory panel data is 14.27 and the corresponding probability of a chance correlation is less than 0.001.

Having determined this function, the intensity dimension of an unknown odorant can then be quantitatively measured in accordance with the invention, provided the same stationary phase materials are used in determining the relative solubilities or Kovats Indices.

TABLE I.—CONCENTRATION OF ODORANTS EXHIBITING ODOR INTENSITY EQUIVALENT TO 250 p.p.m. (VOL.) OF 1-BUTANOL IN AIR

| Odorant | Log$_{10}$ concentration in air: ng./liter | | Kovats indices | | | |
| --- | --- | --- | --- | --- | --- | --- |
| | Sensory panel | Calculated | $K_1$* | $K_2$* | $K_3$* | $K_4$* |
| 1. Ethanol | 7.47 | 6.98 | 714 | 605 | 436 | 393 |
| 2. n-Propanol | 6.48 | 6.00 | 824 | 710 | 537 | 502 |
| 3. Iso-propanol | 6.55 | 6.76 | 741 | 643 | 473 | 442 |
| 4. 1-butanol | 5.81 | 5.17 | 934 | 822 | 644 | 606 |
| 5. 1-hexanol | 3.69 | 4.18 | 1,147 | 1,037 | 852 | 812 |
| 6. Acetone | 6.81 | 7.32 | 710 | 803 | 478 | 441 |
| 7. Butanone (MEK) | 5.99 | 6.48 | 804 | 895 | 580 | 546 |
| 8. Chloroform | 6.94 | 6.04 | 839 | 719 | 610 | 619 |
| 9. Carbon tetrachloride | 7.24 | 6.39 | 788 | 733 | 673 | 686 |
| 10. 1,1,2,2-tetrachloroethane | 5.21 | 5.19 | 1,241 | 1,078 | 895 | 914 |
| 11. 1-octene | 5.44 | 5.81 | 825 | 811 | 789 | 787 |
| 12. 2-octene | 5.06 | 5.52 | 851 | 831 | 814 | 808 |
| 13. 2-octyne | 4.09 | 4.37 | 974 | 894 | 864 | 850 |
| 14. Nitropropane | 5.93 | 5.60 | 1,043 | 1,121 | 715 | 680 |
| 15. Acetonitrile | 7.05 | 6.75 | 800 | 870 | 478 | 429 |
| 16. Pyridine | 4.19 | 5.44 | 1,015 | 1,013 | 742 | 734 |
| 17. Thiophene | 4.65 | 6.00 | 873 | 817 | 674 | 692 |
| 18. Benzene | 6.16 | 6.21 | 832 | 797 | 668 | 682 |
| 19. Toluene | 5.74 | 5.62 | 934 | 905 | 771 | 790 |
| 20. Mesitylene | 5.81 | 5.33 | 1,132 | 1,093 | 968 | 1,001 |
| 21. Styrene | 5.48 | 5.38 | 1,102 | 1,062 | 891 | 915 |
| 22. 2,4-dimethylpentane | 7.63 | 7.75 | 632 | 645 | 632 | 628 |
| 23. Butylacetate | 4.50 | 4.90 | 987 | 1,040 | 792 | 748 |
| 24. Propylbutyrate | 5.03 | 4.44 | 1,053 | 1,106 | 879 | 835 |
| 25. Butylether | 4.91 | 4.76 | 941 | 923 | 874 | 857 |
| 26. 1,4-dioxane | 6.35 | 5.47 | 943 | 937 | 699 | 679 |
| 27. Cyclohexane | 7.09 | 7.09 | 712 | 709 | 679 | 694 |
| 28. 1-iodobutane | 5.25 | 5.65 | 972 | 956 | 821 | 840 |

*The gas chromatographic stationary phase materials corresponding to the Kovats indices (K) are:
 $K_1$ = sucrose acetate isobutyrate,
 $K_2$ = QF1,
 $K_3$ = OV1,
 $K_4$ = Apiezon M.

The odor intensity threshold concentration is defined as that concentration of the odorant in air at which 50 percent of a representative sensory test panel would detect the odor and 50 percent would not. The following correlation function was calculated as described hereinabove by "best fit" regression analysis for test panel data corresponding Kovats Index data for various test samples, and this equation may be used to calculate the threshold concentration value for odorant samples from the respective Kovats Indeces using the same stationary phase material:

$$\text{Log}_{10}C_{thr} = 21.48 - 3.75 \times 10^{-2}K_5 + 2.02 \times 10^{-5}K_5^2$$

where:
$C_{thr}$ is the threshold concentration of the odorant in nanogram per liter; and
$K_5$ is the Kovats Index of the odorant in a particular stationary phase material, dinonylphthalate.

It is interesting to note that in the dimension of threshold concentration, the Kovats Index of only one gas-chromatographic stationary phase material is required. This is abnormal, and for the other odorant dimensions, four or five Kovats Indices are required to characterize the odorant dimension.

The test panel data and the Kovats Index data used in the regression calculation is set forth in Table II. The threshold concentrations for each of the test sample materials were calculated from the Kovats Index data in accordance with this function for the various odorants and are also presented in Table II. The F-ratio index for the correlation of the test panel data and the calculated value was 11.61 and the corresponding probability of a chance correlation is less than 0.001.

TABLE II
THRESHOLD CONCENTRATION OF ODORANTS IN AIR

| ODORANT | Log₁₀ Concentration in air; ng/liter | | Kovats Index $K_5=$ |
|---|---|---|---|
| | Sensory Panel | Calculated | |
| 1. Ethanol | 6.16 | 6.87 | 555 |
| 2. n-Propanol | 5.00 | 5.48 | 663 |
| 3. iso-Propanol | 6.20 | 6.34 | 592 |
| 4. 1-Butanol | 3.89 | 4.54 | 773 |
| 5. t-Butanol | 6.50 | 6.01 | 617 |
| 6. 1-Hexanol | 4.15 | 4.11 | 985 |
| 7. Allylalcohol | 3.43 | 5.40 | 670 |
| 8. Hexanal | 3.43 | 4.08 | 889 |
| 9. Acetone | 6.26 | 6.45 | 584 |
| 10. Butanone (MEK) | 5.36 | 5.24 | 686 |
| 11. Chloroform | 6.12 | 4.93 | 720 |
| 12. Carbon tetrachloride | 6.30 | 5.00 | 712 |
| 13. 1,1,2,2Tetrachloroethane | 4.71 | 4.43 | 1068 |
| 14. 1-Iodobutane | 4.62 | 4.06 | 901 |
| 15. 1-Octene | 3.70 | 4.37 | 803 |
| 16. 2-Octene | 3.73 | 4.26 | 825 |
| 17. 2-Octyne | 3.42 | 4.05 | 906 |
| 18. Nitropropane | 5.72 | 4.08 | 885 |
| 19. Acetonitrile | 6.59 | 5.82 | 663 |
| 20. Pyridine | 3.35 | 4.14 | 859 |
| 21. Thiophene | 2.48 | 4.62 | 760 |
| 22. Benzene | 5.68 | 4.79 | 737 |
| 23. Toluene | 4.82 | 4.19 | 845 |
| 24. Mesitylene | 4.45 | 4.38 | 1058 |
| 25. Styrene | 3.87 | 4.12 | 989 |
| 26. 2,4,Dimethylpentane | 6.21 | 5.85 | 630 |
| 27. Butylacetate | 3.41 | 4.12 | 867 |
| 28. Butylether | 3.99 | 4.08 | 890 |
| 29. 1,4-Dioxane | 5.42 | 4.42 | 793 |
| 30. Cyclohexane | 6.50 | 5.23 | 687 |

* The Gas Chromatographic Stationary Phase material corresponding to Kovats Index ($K_5$) is Dinonylphthalate.

The threshold concentration of an unknown odorant can be determined from this function if the same stationary phase material is used in the determination of the Kovats Index.

As previously mentioned, an important psychophysical or sensory dimension of an odorant is the change in intensity of odor sensation resulting from changes in the odorant concentration. This function is generally characterized by the psychophysical power function:

$$I = kZ^n$$

where
$I$ is the intensity of the sensation;
$Z$ is the concentration of the odorant in air;
and $k$ and $n$ are constants depending on the nature of the odorant, n being typically in the range of 0.15 to 0.9.

Rewritten in a logarithmic form, this function becomes $$\text{Log}_{10}I = \text{Log}_{10}k + n\,\text{log}_{10}Z$$

which can then be plotted as a straight line on log-log coordinates. This function may be measured with respect to a reference material, for example 1-butanol. When this function is plotted, an odorant which changes intensity with respect to concentration at the same rate as the odor of 1-butanol will have a slope of about 0.64. Odorants with lesser slope decrease in the odor sensation intensity with decrease in the concentration at a slower rate than 1-butanol, the reverse being true for ordorants with a larger slope. For the purposes of the described embodiment, odorants will be characterized by the proportional factor by which their slope differs from that of the 1-butanol reference material.

The following correlation function, with respect to the indicated stationary phase materials was determined for the slope factor by statistical regression analysis as described hereinabove, from sensory test panel data and Kovats Index data for the odorants listed in Table III.

$$S_F = 1.14 + 2.27 + 10^{-6}(K_6 - K_3)^2 + 2.36 \times 10^{-5}(K_5 - K_3)K_3 - 02.01 \times 10^{-5}(K_7 - K_3)K_3$$

where
$S_F$ is the slope factor;
$K_3$ is the Kovats Index of the odorant in the stationary phase material, OV1, a methylsilicone oil;
$K_5$ is the Kovats Index of the odorant in the stationary phase material dinonylphthalate;
$K_6$ is the Kovats Index of the odorant in the stationary phase material, sucrose octaacetate; and
$K_7$ is the Kovats Index of the odorant in the stationary phase material, acetyltributylcitrate.

Using the above correlation function the slope factors for the various odorants were back-calculated relative to 1-butanol and are presented in Table III together with sensory panel data and the Kovats Indices. The F-ratio index for this correlation is 17.58 and the corresponding probability of a chance correlation is less than 0.001.

The equation can be used to calculate the quantitative value of the slope function for an odorant sample, using the Kovats Index data of the sample for the same stationary phase materials.

TABLE III.—SLOPE FACTORS OF PSYCHOPHYSICAL ODOR INTENSITY FUNCTION FOR VARIOUS ODORANTS RELATIVE TO THAT OF 1-BUTANOL

| | Odorant | Slope factor | | Kovats indices | | | |
|---|---|---|---|---|---|---|---|
| | | Sensory panel | Calculated | $K_3$* | $K_5$* | $K_6$* | $K_7$* |
| 1 | Ethanol | 1.19 | 1.19 | 436 | 555 | 949 | 939 |
| 2 | n-Propanol | 1.00 | 1.07 | 537 | 663 | 1,050 | 749 |
| 3 | Iso-propanol | 1.11 | 1.10 | 473 | 592 | 955 | 673 |
| 4 | 1-butanol | 1.00 | 0.97 | 644 | 773 | 1,172 | 858 |
| 5 | t-Butanol | 1.03 | 1.00 | 507 | 617 | 948 | 694 |
| 6 | 1-hexanol | 0.80 | 0.74 | 852 | 985 | 1,389 | 1,070 |
| 7 | Allylalcohol | 1.14 | 1.15 | 527 | 670 | 1,126 | 772 |
| 8 | Acetone | 1.38 | 1.21 | 478 | 584 | 933 | 645 |
| 9 | Butanone (MEK) | 1.20 | 1.14 | 580 | 686 | 1,018 | 742 |
| 10 | Chloroform | 1.07 | 1.00 | 610 | 720 | 1,031 | 784 |
| 11 | Carbon tetrachloride | 1.10 | 0.87 | 673 | 712 | 918 | 749 |
| 12 | 1,1,2,2-tetrachloroethane | 0.99 | 0.99 | 895 | 1,068 | 1,547 | 1,161 |
| 13 | 1-iodobutane | 1.25 | 1.10 | 821 | 901 | 1,117 | 930 |
| 14 | Hexanal | 0.98 | 1.04 | 784 | 889 | 1,198 | 939 |
| 15 | 1-octene | 0.68 | 0.97 | 789 | 803 | 863 | 817 |
| 16 | 2-octene | 0.84 | 0.96 | 814 | 825 | 897 | 839 |
| 17 | 2-octyne | 0.74 | 0.75 | 864 | 906 | 1,098 | 943 |
| 18 | Nitropropane | 1.33 | 1.29 | 715 | 885 | 1,339 | 966 |
| 19 | Acetonitrile | 1.24 | 1.37 | 478 | 633 | 1,092 | 726 |
| 20 | Pyridine | 0.94 | 1.02 | 742 | 859 | 1,285 | 933 |
| 21 | Thiophene | 0.62 | 0.92 | 674 | 760 | 1,078 | 819 |
| 22 | Benzene | 0.99 | 0.88 | 668 | 737 | 1,006 | 788 |
| 23 | Toluene | 0.98 | 0.89 | 771 | 845 | 1,109 | 891 |
| 24 | Mesitylene | 0.79 | 1.02 | 968 | 1,058 | 1,300 | 1,093 |
| 25 | Styrene | 0.88 | 0.80 | 891 | 989 | 1,321 | 1,049 |
| 26 | 2,4-dimethylpentane | 1.17 | 1.10 | 635 | 630 | 622 | 633 |
| 27 | Butylacetate | 0.67 | 0.76 | 792 | 867 | 1,188 | 927 |
| 28 | Propylbutyrate | 0.75 | 0.66 | 879 | 943 | 1,237 | 998 |
| 29 | Butylether | 0.58 | 0.64 | 874 | 890 | 1,018 | 924 |
| 30 | 1,4-dioxane | 1.06 | 1.02 | 699 | 793 | 1,214 | 861 |
| 31 | Cyclohexane | 1.23 | 1.10 | 679 | 687 | 765 | 693 |

*The gas chromatographic stationary phase materials corresponding to the Kovats indices (K) are:
$K_3$ = OV1 methylsilicone oil,
$K_5$ = dinonylphthalate,
$K_6$ = sucrose octaacetate,
$K_7$ = acetyltributylcitrate.

The hedonic value, or pleasantness - unpleasantness, dimension data of an odor may be obtained from sensory panels by having a value assigned to the odor, by human judgments, on a scale ranging from 1 to 7 where 7 denotes an odor of highest pleasantness and 1 denotes an odor of highest unpleasantness. When sensory panel tests are run, the concentration of the odorant is adjusted to produce an odor intensity approximately equal to 250 ppm by volume of 1-butanol to minimize intensity effects on this evaluation.

Test panel hedonic value data for various odorants listed in Table IV is used, as described hereinabove, to correlate with Kovats Index data for the indicated stationary phases, to determine the following mathematical correlation function for the hedonic value dimension:

$$V_H = 3.33 + 2.17 \times 10^{-2} |K_4 - K_3| - 5.4 \times 10^{-9}(K_1 - K_3)K_3^2$$

where
$V_H$ is the hedonic value;
$K_1$ is the Kovats Index of the odorant in one stationary phase material, sucrose acetate isobutyrate and;
$K_3$ is the Kovats Index of the odorant in another stationary phase material, OV1 methylsilicone oil;
$K_4$ is the Kovats Index of the odorant in another stationary phase material, Apiezon M;
the symbol $|K_4 - K_3|$ indicates that the absolute value rather than the algebraic differences between $K_4$ and $K_3$ are used.

TABLE IV.—HEDONIC VALUES OF ODORANTS

| | Odorant | Hedonic value | | Kovats indices | | |
|---|---|---|---|---|---|---|
| | | Sensory panel | Calculated | $K_1$* | $K_3$* | $K_4$* |
| 1 | Methanol | 3.27 | 3.47 | 655 | 364 | 348 |
| 2 | Ethanol | 4.30 | 4.00 | 714 | 436 | 393 |
| 3 | n-Propanol | 4.27 | 3.64 | 824 | 537 | 502 |
| 4 | Iso-propanol | 3.83 | 3.68 | 741 | 473 | 442 |
| 5 | 1-butanol | 3.06 | 3.50 | 934 | 644 | 606 |
| 6 | 1-hexanol | 4.26 | 3.04 | 1,147 | 852 | 812 |
| 7 | 2-hexanol | 3.26 | 3.12 | 1,050 | 785 | 754 |
| 8 | 3-hexanol | 3.50 | 3.03 | 1,037 | 782 | 757 |
| 9 | 3-methyl-3-pentanol | 2.63 | 2.96 | 985 | 744 | 728 |
| 10 | Acetone | 3.63 | 3.85 | 710 | 478 | 441 |
| 11 | Butanone (MEK) | 3.36 | 3.66 | 804 | 580 | 546 |
| 12 | 2-pentanone | 3.83 | 3.45 | 889 | 670 | 640 |
| 13 | 2-hexanone | 3.76 | 3.31 | 994 | 773 | 741 |
| 14 | Chloroform | 3.76 | 3.07 | 839 | 610 | 619 |
| 15 | Carbon tetrachloride | 3.86 | 3.33 | 788 | 673 | 686 |
| 16 | 1-chlorohexane | 3.43 | 2.87 | 981 | 851 | 849 |
| 17 | 1,1,2,2-tetrachloroethane | 3.03 | 2.24 | 1,241 | 895 | 914 |
| 18 | 1-bromopentane | 3.30 | 3.01 | 974 | 830 | 840 |
| 19 | 1-iodobutane | 2.60 | 3.39 | 972 | 821 | 849 |
| 20 | Propanal | 2.50 | 3.62 | 688 | 478 | 453 |
| 21 | 1-octene | 2.33 | 3.26 | 825 | 789 | 787 |
| 22 | 2-octene | 2.00 | 3.33 | 851 | 814 | 808 |
| 23 | 2-octyne | 1.70 | 3.36 | 974 | 811 | 850 |
| 24 | Nitromethane | 3.53 | 3.73 | 910 | 536 | 491 |
| 25 | Nitroethane | 3.03 | 3.50 | 967 | 626 | 585 |
| 26 | Nitropropane | 3.97 | 3.18 | 1,043 | 715 | 680 |
| 27 | Acetonitrile | 3.93 | 3.80 | 800 | 478 | 429 |
| 28 | Valeronitrile | 1.29 | 3.00 | 1,057 | 749 | 710 |
| 29 | Pyridine | 1.33 | 2.69 | 1,015 | 742 | 734 |
| 30 | Thiophene | 1.07 | 3.23 | 873 | 674 | 692 |
| 31 | Hexanethiol | 1.10 | 2.91 | 1,057 | 916 | 926 |
| 32 | Benzene | 4.47 | 3.24 | 832 | 668 | 682 |
| 33 | Toluene | 4.37 | 3.22 | 934 | 771 | 790 |
| 34 | Ethynylbenzene | 1.93 | 2.26 | 1,137 | 872 | 873 |
| 35 | Mesitylene | 3.43 | 3.21 | 1,132 | 968 | 1,001 |
| 36 | Styrene | 2.93 | 3.33 | 1,102 | 891 | 915 |
| 37 | 2,4-dimethylpentane | 3.53 | 3.42 | 632 | 632 | 628 |
| 38 | 2-methylheptane | 4.03 | 3.40 | 766 | 767 | 764 |
| 39 | 3-methylheptane | 4.43 | 3.37 | 778 | 776 | 774 |
| 40 | 2,2,5-trimethylhexane | 4.13 | 3.66 | 783 | 788 | 773 |
| 41 | Butylacetate | 5.23 | 3.62 | 987 | 792 | 748 |
| 42 | Propylbutyrate | 2.50 | 3.56 | 1,053 | 879 | 835 |
| 43 | Butylether | 3.63 | 3.42 | 941 | 874 | 857 |
| 44 | 1,4-dioxane | 4.33 | 3.12 | 943 | 699 | 679 |
| 45 | Anisole | 3.13 | 2.37 | 1,163 | 910 | 918 |
| 46 | Cyclohexane | 4.13 | 3.58 | 712 | 679 | 694 |
| 47 | Decalin | 3.83 | 3.77 | 1,181 | 1,110 | 1,152 |

*The gas chromatographic stationary phase materials corresponding to the Kovats indices (K) are:
$K_1$ = sucrose acetate isobutyrate,
$K_3$ = OV1 methylsilicone oil,
$K_4$ = Apiezon M.

Hedonic values calculated in accordance with this function for several odorants are presented in Table IV together with the sensory panel data and the Kovats Indices for the odorants. The F-ratio value for the correlation was 4.10 and the corresponding chance probability was less than 0.025.

It is noted that the probability of a chance correlation for this dimension, as well as for odor quality, is much higher than for the intensity dimensions. This is probably due to the fact that it is much more difficult for humans to agree on qualitative judgments than the quantitative intensity judgments. Nevertheless, the correlation is well within the 0.05 criterion previously mentioned.

The odor character or quality is described in terms of similarlity of an odor to some other selected odor and can be rated by sensory panels on a 7 point scale where 0 denotes odors which are exactly similar and 7 denotes odors which are extremely different.

Odor quality dimension test panel data and Kovats Index data for various odorants, with respect to pyridine as a reference material and for the indicated stationary phase materials, is presented in Table V, and such data for various odorants, with respect to isopropanol as a reference material, is presented in Table VI. Statistical correlation of the test panel data for the respective reference materials, with the Kovats Index data as described hereinabove, results in the following equations:

$$D_{(pyridine)} = 4.00 + 1.8 \times 10^{-5} K_2 (K_1 - K_3) - 6.5 \times 10^{-8} (K_1 - K_3)^2 K_8$$

and in terms of its distance on the scale from the odor of isopropanol by the function:

$$D_{(isopropanol)} = 1.46 - 1.28 \times 10^{-5} (K_9 - K_3)^2 - 3.3 \times 10^{-3} (K_1 - K_3) K_3 + 2.71 \times 10^{-4} (K_1 - K_3) K_8 + 4.5 \times 10^{-6} K_{10}^2$$

where $D$ is the distance of the odorant from the reference odorant on the 7 point quality scale;

$K_1$ is the Kovats Index of the odorant in one stationary phase material, sucrose acetate isobutyrate;

$K_2$ is the Kovats Index of the odorant in another stationary phase material, QF1;

$K_3$ is the Kovats Index of the odorant in another stationary phase material, OV1 and;

$K_8$ is the Kovats Index of the odorant in another stationary phase material, polyphenylether;

$K_9$ is the Kovats Index of the odorant in another stationary phase material, tris (cyanoethoxy) propane;.and $K_{10}$ is the Kovats Index of the odorant in another stationary phase material, Carbowax 4,000, a polyglycol phase.

It will be observed that while the two correlation functions above both measure odor quality, but with respect to different reference odors, the GC property terms of the two function are not the same. This is a result of using the statistical stepwise regression analysis program, which produces a best fit result for the different reference materials. It is appropriate that these functions would differ because the quality comparison is made with respect to different reference materials. The numerical odor quality values obtained for a given sample from the first equation are values with respect to pyridine as a reference material, while those obtained for the second equation are values with respect to isopropanol as a reference material. Such a variation could also occur with any of the other odor dimensions mentioned above.

Using the above functions, the sensory distances of various odorants to pyridine and isopropanol were calculated using the Kovats Indices determined and are presented in Tables V and VI. The F-ratio statistical index for the sensory distance to pyridine was 7.05 with the corresponding chance probability of the correlation being less than 0.01. For the sensory distance to isoproponal, the F-ratio was 4.51 with the corresponding probability being less than 0.025. As before, the odor quality dimension of an odorant sample with respect to either pyridine or isopropanol may be determined without the use of a test panel, by determining the Kovats Index data for the sample for the indicated stationary phase gas chromatographic materials, and using these equations to calculate the odor quality value which would be found by a test panel.

TABLE V.—ODOR QUALITY RELATIVE TO PYRIDINE

| Odorant | Sensory distance to pyridine on 7 point scale* | | Kovats indices | | | |
|---|---|---|---|---|---|---|
| | Sensory panel | Calculated | $K_1$** | $K_2$** | $K_3$** | $K_8$** |
| 1. Ethanol | 3.06 | 4.05 | 714 | 605 | 436 | 602 |
| 2. n-Propanol | 4.06 | 3.92 | 824 | 710 | 537 | 711 |
| 3. Iso-propanol | 5.89 | 5.98 | 741 | 643 | 473 | 632 |
| 4. 1-butanol | 4.94 | 3.86 | 934 | 822 | 644 | 822 |
| 5. t-Butanol | 3.94 | 4.49 | 755 | 679 | 507 | 649 |
| 6. Allylalcohol | 3.78 | 3.19 | 853 | 702 | 527 | 723 |
| 7. Acetone | 4.67 | 5.10 | 710 | 803 | 478 | 661 |
| 8. Butanone (MEK) | 5.61 | 5.16 | 804 | 895 | 580 | 769 |
| 9. Chloroform | 4.33 | 4.35 | 839 | 719 | 610 | 780 |
| 10. Carbon tetrachloride | 6.06 | 4.86 | 788 | 733 | 673 | 799 |
| 11. Acetonitrile | 4.94 | 4.37 | 800 | 870 | 478 | 705 |
| 12. Thiophene | 4.59 | 4.72 | 873 | 817 | 674 | 875 |
| 13. Benzene | 4.87 | 4.93 | 832 | 797 | 668 | 835 |
| 14. Toluene | 5.56 | 5.07 | 934 | 905 | 771 | 942 |
| 15. Styrene | 4.56 | 4.90 | 1,102 | 1,062 | 891 | 1,104 |
| 16. 2,4-dimethylpentane | 3.25 | 4.00 | 632 | 645 | 632 | 619 |
| 17. Butylacetate | 6.04 | 5.35 | 987 | 1,040 | 792 | 956 |
| 18. Butylether | 4.62 | 4.86 | 941 | 923 | 874 | 941 |
| 19. 1,4-dioxane | 3.00 | 4.59 | 943 | 937 | 699 | 929 |
| 20. Cyclohexane | 4.36 | 4.38 | 712 | 709 | 679 | 743 |

*0 indicating exact similarity and 7 indicating complete dissimilarity.
**The gas chromatographic stationary phase materials corresponding to the Kovast indices (K) are:
$K_1$=sucrose acetate isobutyrate,
$K_2$=QF1, a silicone oil,
$K_3$=OV1, a methylsilicone oil,
$K_8$=polyphenylether.

TABLE VI.—ODOR QUALITY RELATIVE TO ISOPROPANOL

| | | Sensory distance to isopropanol on 7 point scale* | | Kovats indices | | | | |
|---|---|---|---|---|---|---|---|---|
| | Odorant | Sensory panel | Calculated | $K_1$** | $K_3$** | $K_8$** | $K_9$** | $K_{10}$** |
| 1 | Ethanol | 2.78 | 2.34 | 714 | 436 | 602 | 1,249 | 925 |
| 2 | n-Propanol | 2.87 | 2.47 | 824 | 537 | 711 | 1,347 | 1,033 |
| 3 | n-Butanol | 1.56 | 2.00 | 934 | 644 | 822 | 1,460 | 1,143 |
| 4 | t-Butanol | 1.91 | 1.50 | 755 | 507 | 649 | 1,175 | 883 |
| 5 | Allylalcohol | 3.78 | 3.24 | 853 | 527 | 723 | 1,460 | 1,110 |
| 6 | Acetone | 1.76 | 2.04 | 710 | 478 | 661 | 1,251 | 838 |
| 7 | Butanone (MEK) | 1.82 | 2.06 | 804 | 580 | 769 | 1,330 | 926 |
| 8 | Chloroform | 2.81 | 3.71 | 839 | 610 | 780 | 1,237 | 1,032 |
| 9 | Carbon tetrachloride | 2.33 | 2.87 | 788 | 673 | 799 | 1,048 | 906 |
| 10 | Acetonitrile | 3.44 | 3.91 | 800 | 478 | 705 | 1,497 | 1,037 |
| 11 | Pyridine | 5.89 | 5.01 | 1,015 | 742 | 997 | 1,642 | 1,225 |
| 12 | Thiophene | 5.67 | 3.83 | 873 | 674 | 875 | 1,347 | 1,059 |
| 13 | Benzene | 1.81 | 2.49 | 832 | 668 | 835 | 1,256 | 980 |
| 14 | Toluene | 2.17 | 2.63 | 934 | 771 | 942 | 1,359 | 1,079 |
| 15 | Styrene | 2.78 | 3.71 | 1,102 | 891 | 1,104 | 1,614 | 1,295 |
| 16 | 2,4-dimethylpentane | 2.50 | 3.24 | 632 | 632 | 619 | 597 | 615 |
| 17 | Butylacetate | 2.82 | 1.75 | 987 | 792 | 956 | 1,404 | 1,088 |
| 18 | Butylether | 3.44 | 2.99 | 941 | 874 | 941 | 1,110 | 975 |
| 19 | 1,4-dioxane | 2.41 | 3.61 | 943 | 699 | 929 | 1,521 | 1,101 |
| 20 | Cyclohexane | 4.00 | 3.15 | 712 | 679 | 743 | 837 | 763 |

*0 indicating exact similarity and 7 indicating complete dissimilarity.
**The gas chromatographic stationary phase materials corresponding to the Kovats indices (K) are:
  $K_1$=sucrose acetate isobutyrate,
  $K_3$=OV1, a methylsilicone oil,
  $K_8$=polyphenylether,
  $K_9$=tris (cyanoethoxy)propane,
  $K_{10}$=Carbowax 4000, a polyglycol phase.

Having established a predetermined correlation function for each of the odorant dimensions, as illustrated by the previously described specific examples, the subjective odor dimensions of an odorant sample may be determined, even if it is an unknown material by determining the relative solubilities or Kovats Indices of the sample with respect to the selected stationary phases, and using the predetermined mathematical correlation functions for these selected phases, to calculate the numerical values of the various odorant dimensions of the sample.

Thus, in accordance with the invention, when the predetermined correlation is established, all of the known subjective odor dimensions, even for an unknown odorant sample, can be determined in such a manner as to reproduce, with a degree of accuracy exceeding that considered acceptable in the life science discipline, the respective human judgments, using only the gas-chromatographic data obtained on the sample. As a result thereof, the method of this invention can be substituted for sensory panel measurements with the advantage of being less expensive and less cumbersome while maintaining the same accuracy.

It should be understood that various changes can be made in the practice of the method taught herein without departing from the true scope and spirit of the invention herein described. For example, although the gas-chromatographic property used herein was in terms of Kovats Index, Rohrschnieder constants, which are another means of expressing gas-chromatographic data and which are well known in the gas-chromatographic art, could be equally well utilized.

What is claimed is:

1. A method for the determination of quantitative, numerical values of one or more subjective dimensions of an atmospheric odorant, comprising the steps of
   providing an atmospheric sample of the odorant to be analyzed,
   quantitatively measuring the relative gas chromatographic solubility of the odorant sample with respect to each of a plurality of preselected, different gas chromatographic stationary phase materials, said stationary phase materials being preselected such that at least one of said materials is a nonpolar material and such that at least two of said stationary phase materials are different polar materials,
   providing for each of said subjective odorant dimensions a predetermined mathematical correlation function which is single valued with respect to odorant dimension and which states odorant dimension as a function of relative gas chromatographic solubilities in said preselected stationary phase materials, said function being statistically predetermined to correlate subjective known values of the odorant dimension for each of a plurality of different known odorant materials, with the respective relative gas chromatographic solubilities of said different known odorant materials in said different gas chromatographic stationary phase materials, and
   deriving the numerical value of each of said predetermined mathematical correlation functions for the relative solubility values measured for said atmospheric odorant sample, to result in quantitative numerical values of the respective subjective dimensions of the odorant sample without direct human test panel evaluation of the odorant sample.

2. A method in accordance with claim 1 wherein said mathematical correlation function is predetermined by statistically correlating subjective odorant dimension data and relative solubility data with respect to a plurality of at least 5 different known odorant materials.

3. A method in accordance with claim 2 wherein said relative solubilities are determined as Kovats Indices.

4. A method in accordance with claim 3 wherein said subjective odorant dimensions are selected from a plurality of odor intensity, intensity change with concentration, odor threshold intensity, hedonic value odor quality and combinations of these dimensions.

5. A method in accordance with claim 4 wherein said relative solubilities of the odorant sample with respect to each of said stationary phase materials are measured substantially simultaneously by introducing said odorant sample at a first point in time into a gas chromatographic carrier gas stream at a first zone, continuing the carrier gas stream flow after said first point in time, conducting the carrier gas and sample stream to a plurality of gas chromatographic column zones each separately containing one of said stationary materials, dividing said gas and sample stream into a plurality of streams and passing one of said streams through each of said gas chromatographic zones, and detecting the time of emergence of the odorant sample from each of said gas chromatographic zones.

6. A method in accordance with claim 4 wherein each of said mathematical functions has the series form:

Subjective Odorant Dimension $= C_0 + C_1$ (GC property No. 1) $+ C_2$(GC property No. 2) $+ C_3$ (GC property No. 3)...

wherein the GC property functions are gas chromatographic parameters based on relative odorant solubilities in said different stationary phase materials and wherein $C_0, C_1, C_2, C_3 \ldots$ are constants, determined by statistical stepwise regression correlation analysis of said subjective known values and said solubilities of said known materials to result in a correlation of the equation variables such that the probability of error is less than 0.05.

7. A method in accordance with claim 6 wherein said GC property functions are selected from Kovats Indices and sums, differences, squares, multiplicative products and higher order terms of Kovats Indices, and transformations thereof.

* * * * *